United States Patent [19]

Everett

[11] 4,262,978
[45] Apr. 21, 1981

[54] BEARING ASSEMBLIES

[76] Inventor: Woodrow W. Everett, 3908 W. Van Buren, Phoenix, Ariz. 85021

[21] Appl. No.: 90,661

[22] Filed: Nov. 2, 1979

[51] Int. Cl.³ .......................... F16C 1/24; F16C 33/72
[52] U.S. Cl. ................................... 308/36.1; 308/109; 308/187
[58] Field of Search .................. 184/105 B; 308/36.1, 308/76, 78, 106, 108, 109, 116, 187, 187.1, 187.2

[56] References Cited

U.S. PATENT DOCUMENTS

| | | | |
|---|---|---|---|
| 1,660,728 | 2/1978 | Stokes | 184/105 |
| 1,776,641 | 9/1930 | Smith . | |
| 3,077,948 | 2/1963 | Law | 184/45 |
| 3,102,737 | 9/1963 | Williams et al. | 308/187 X |
| 3,320,006 | 5/1967 | Cozzarin | 308/36.1 |
| 3,320,007 | 5/1967 | Tennies et al. | 308/36.1 |
| 3,393,015 | 7/1968 | Kaufman | 308/108 |
| 3,460,874 | 8/1969 | Johnson | 308/187.2 |
| 3,649,080 | 3/1972 | Mollnare | 308/187 |

Primary Examiner—Frederick R. Schmidt
Attorney, Agent, or Firm—Warren F. B. Lindsley

[57] ABSTRACT

A sealed bearing assembly which provides a grease flow path from the bearing area of the assembly through at least a part of the spindle and outwardly thereof to atmosphere for relieving pressure in the grease fitting and making it possible to repack the bearing without disassembling the structure.

9 Claims, 7 Drawing Figures

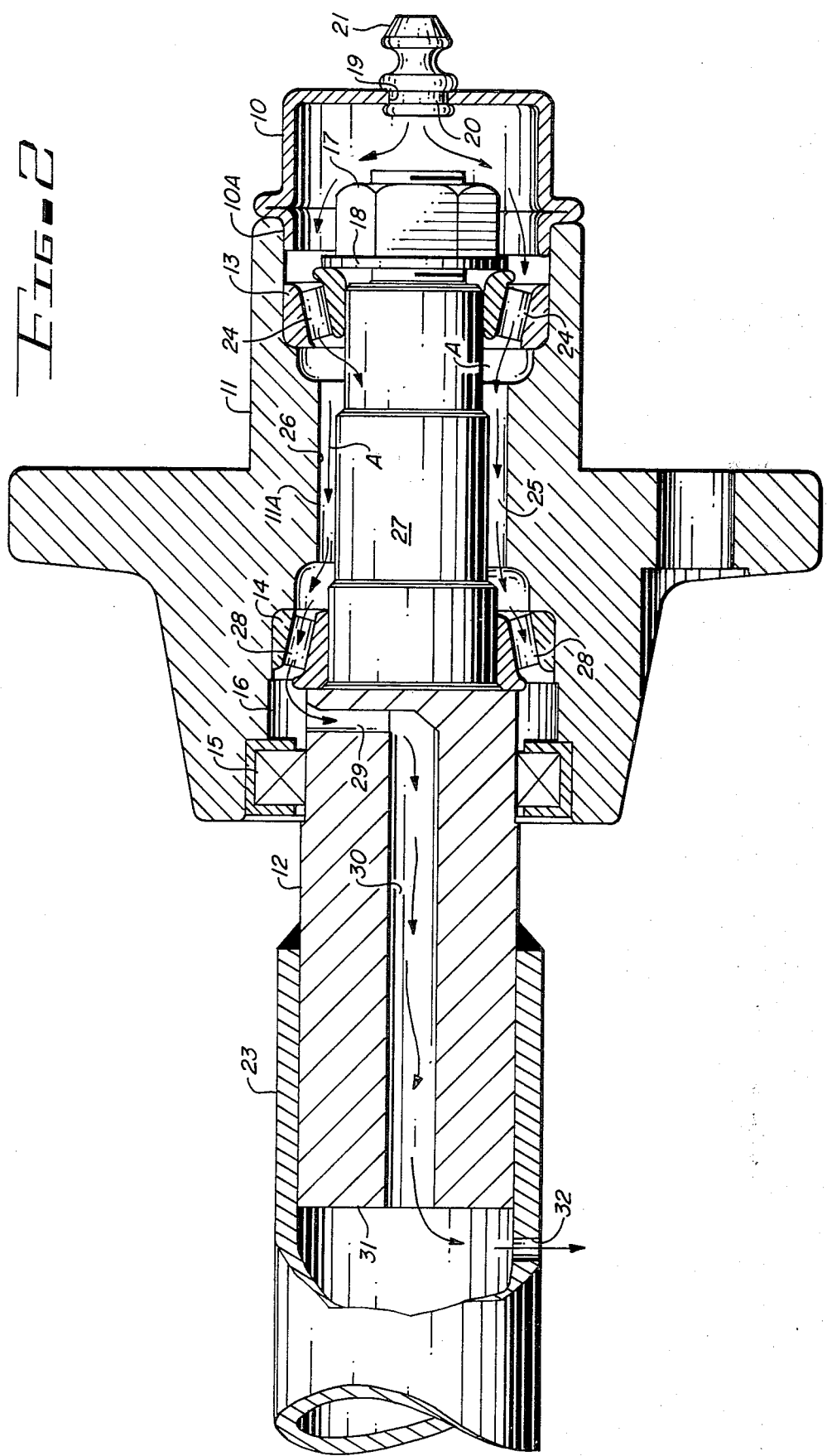

BEARING ASSEMBLIES

BACKGROUND OF THE INVENTION

This invention relates to bearing structures and more specifically to an improved bearing assembly for venting a wheel bearing used on boat trailers, conveyors and the like.

Prior art sealed bearings are packed in grease without adaquate pressure relief. Excessive pressure build-up in these bearings during outside temperature change as well as heat produced therein by friction during normal trailer operation causes expansion of the packing grease and the consequent compression of air trapped in the bearing chamber. Such excessive pressures are undesirable in that they force grease through the sealing surfaces of the bearings relieving pressure therein and they contribute to early failure of the bearing structure.

The towing of the boat trailer to the boat launching site also causes bearing and grease friction which generates heat within the wheel hub. This heat causes pressure to build up within the hub which in turn causes air and grease within the hub to escape through the rotating seal. Then, at the boat launching site, when the boat trailer is backed into the water to launch the boat, the submerged hub is suddenly cooled by the water. This cooling contracts the air inside the hub and creates a partial vacuum therein which causes water and silt to seep into the hub. The resulting rust and erosion inevitably causes bearing damage.

DESCRIPTION OF THE PRIOR ART

U.S. Pat. No. 1,660,728 discloses a depressed hub cap with a pressure grease gun nippled fitting secured in the depression.

U.S. Pat. No. 1,776,641 discloses a hub cap which is permanently attached to the other end of a wheel hub shell.

U.S. Pat. No. 3,077,948 discloses a hub cap apparatus employing a cylindrical member containing a free floating spring loaded piston having a grease fitting. The piston initially seals the hub. As the hub is filled with grease, the pressure forces the piston to move until the hub is no longer sealed. At this point, the excess grease escapes so that the spring loaded piston again seals the hub.

U.S. Pat. Nos. 3,102,737 and 3,649,080 disclose pressure equalization means for preventing damage to bearings and grease seals of boat trailers.

U.S. Pat. Nos. 3,320,006 and 3,320,007 disclose venting means for translation and rotational devices for relieving internal pressures.

U.S. Pat. No. 3,393,015 discloses a hub cap employing an O-ring which encircles a valve opening. The O-ring is forced away from the opening by internal pressure.

U.S. Pat. No. 3,460,874 discloses a sealed bearing structure employing a check valve located on the axis of rotation of the hub for permitting the exit of air under pressure from the sealed bearing structure while preventing entry of water into the sealed bearing structure on immersion of the hub and axle in water.

SUMMARY OF THE INVENTION

It is, therefore, one object of this invention to provide a new and improved bearing assembly.

Another object of this invention is to provide an improved bearing assembly for boat trailers which automatically relieves pressure increase due to pressure lubrication or temperature rise without damaging the bearings or sealing surfaces of the assembly.

A further object of this invention is to provide a new and improved sealed bearing assembly which automatically relieves any vacuum therein caused by the temperature drop occurring when the hot bearing assembly is emerged in the cold water of a lake or river.

A still further object of this invention is to provide a new and improved sealed bearing assembly which prevents contaminants from entering the bearing area of the assembly.

A still further object of this invention is to provide a new and improved sealed bearing assembly which provides a grease flow path from the bearing area of the assembly through all or at least a part of the spindle axially and laterally thereof to atmosphere for relieving pressure in the grease fitting.

A still further object of this invention is to provide a new and improved sealed bearing assembly in which substantially 100 percent of the cavity in the bearing assembly is filled with grease resulting in less pressure change therein due to temperature changes.

A still further object of this invention is to provide a new and improved sealed bearing assembly wherein repacking of the bearing can occur without disassembling of the bearing assembly.

A still further object of this invention is to provide a new and improved sealed bearing assembly which deposits any excess grease discharged from the bearing assembly at a point away from any rotating surface.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 2 is an enlarged cross-sectional view of the bearing assembly shown in FIG. 1 taken along the line 2—2;

DESCRIPTION OF THE PREFERRED EMBODIMENT

Figure 1:
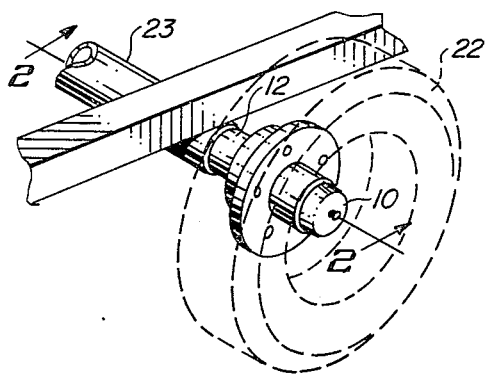
FIG. 1 is a perspective view of a bearing assembly mounted on a boat trailer axle and embodying the invention claimed.
Figure 4:
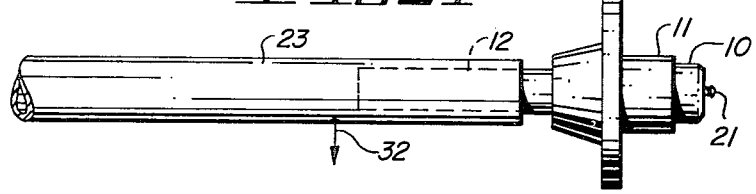
FIG. 4 is a partial front view of the trailer spindle shown in FIG. 1 illustrating the drain hole extending laterally thereof.

Referring more particularly to the drawings by characters of reference, FIGS. 1, 2 and 4 disclose a cylindrical hub cap 10 mounted in a wheel hub 11 which is free to rotate about a spindle 12 by means of bearings 13 and 14. A rotating seal 15 seals a chamber 16 within wheel hub 11 while allowing rotation between wheel hub 11 and spindle 12. The wheel hub 11 is retained in place upon the spindle 12 by means of an attachment means such as a nut 17 held against accidental rotation by any suitable means such as a cotter key (not shown) used in the well known manner at the end of spindle 12 and this nut engages a washer 18 at its inner end. This washer snugly engages the axial outer end of bearing 13.

As shown more clearly in FIG. 2, spindle 12 is reduced in diameter at its outer end with the annular bearings 13 and 14 being spacedly positioned thereover. The hollow wheel hub 11 is provided with a cylindrical portion which is sleeved at one end over the spindle and bearings and has an inwardly extending portion 11A for maintaining the bearings in axially spaced apart relationship along the spindle. The washer 18 and nut 17 threaded over the threaded end of the spindle is in contact with bearing 13 urging it into contact with the radially inwardly extending cylindrical portion 11A and urging bearing 14 also in contact with this portion 11A at its other edge.

The outer end of the hub cap 10 is provided with an opening 19 for receiving the stem 20 of a grease plug or conventional grease gun fitting 21.

To install hub cap 10 in the open end of wheel hub 11, its shouldered end 10A is tapped into the wheel hub to produce a tight interference with the wheel hub.

As shown in FIG. 1, a boat trailer wheel 22 shown in dash lines is suitably bolted to the wheel hub 11 in the usual manner for rotation with axle 23 of the boat trailer.

A conventional grease gun filled with suitable lubricant can be connected to conventional grease fitting 21 on hub cap 10. The grease is pumped into wheel hub 11 and starts to fill it up under pressure. The pressure build-up within hub cap 10 forces grease through the passageways 24 in bearing 13 and into and longitudinally of the chamber 25 formed between the inside surface 26 of wheel hub 11 and the outside surface 27 of spindle 12 as shown by arrows A. The grease under pressure then moves from chamber 25 through passageways 28 in bearings 14 and into chamber 16 formed in the wheel hub 11 between rotating seal 15 and bearing 14.

As noted from FIG. 2 of the drawing, a passageway 29 is provided to extend from chamber 16 laterally through spindle 12 to an interconnecting passageway 30 extending axially through the end 31 of spindle 12 which is fixedly secured in the hollow interior of axle 23. Axle 23 is provided with a port 32 which provides an opening for the draining of any grease or air under pressure to atmosphere that flows out of passageway 30 in spindle 12.

Thus, passageway 29 drilled in the spindle 12 between seal 15 and bearing 14 together with passageway 30 in spindle 12 provides with port 32 in axle 23 an opening from the inside of the bearing area to atmosphere. It should be noted that the length of passageway 30 should be long enough to contain enough grease to provide a dam, reservoir or barrier to prevent water and other contaminants from entering the bearing structure through port 32 and to provide enough grease to compensate for pressure differences in the bearing structure caused by vacuum conditions resulting from temperature variations. The diameter of port 32 should be large enough so as not to restrict the flow of grease while lubricating the bearing structure through fitting 21 or when temperature changes occur within the bearing structure.

The disclosed sealed bearing assembly can be easily lubricated through fitting 21 without danger of damaging the bearing and sealing structures since the relief passageways 29 and 30 and port 32 provide for pressure release. These passageways and port also relieve pressure due to temperature or vacuum changes within the assembly and prevent contaminants from entering the bearing area all without any mechanical devices such as release valves and/or spring loaded devices.

Further, substantially 100 percent of the cavity in the bearing assembly is filled with grease resulting in less pressure change in the assembly due to temperature changes.

It should also be noted that the bearing assembly may be replaced without disassembling the unit. New grease added always forces the old grease out of the assembly through passageways 29 and 30 and port 32.

Figure 3:
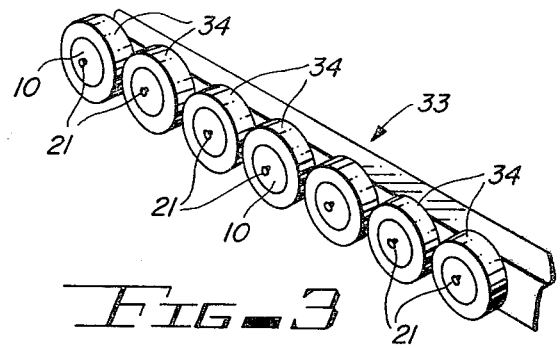
FIG. 3 is a partial perspective view illustrating the use of the bearing assembly on a conveyor belt structure.

FIG. 3 illustrates a partial view of a conveyor mechanism 33 employing a plurality of sealed bearing assemblies embodying the invention wherein like parts have similar references. In this instance, the wheel hub 11 of FIGS. 1 and 2 have been replaced by a cylindrical hub 34.

Figure 5:
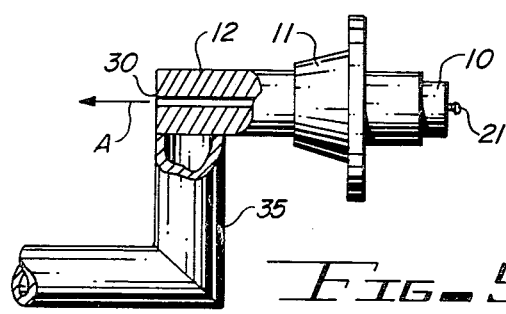
FIG. 5 is a partial perspective broken away view of a modification of the spindle assembly illustrated in FIGS. 1, 2 and 4 showing the drain hole axially of the bearing assembly.
Figure 6:
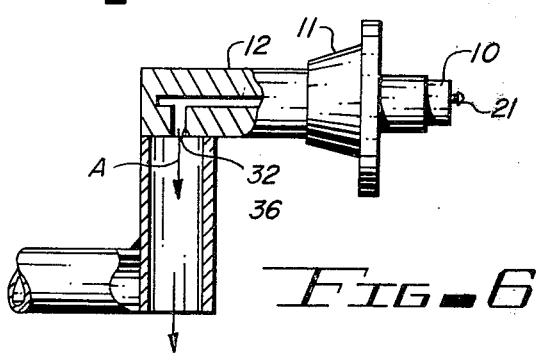
FIG. 6 is a partial perspective broken away view of a still further modification of the spindle assembly shown in FIGS. 1, 2, 4 and 5 showing the drain hole laterally of the bearing assembly.
Figure 7:
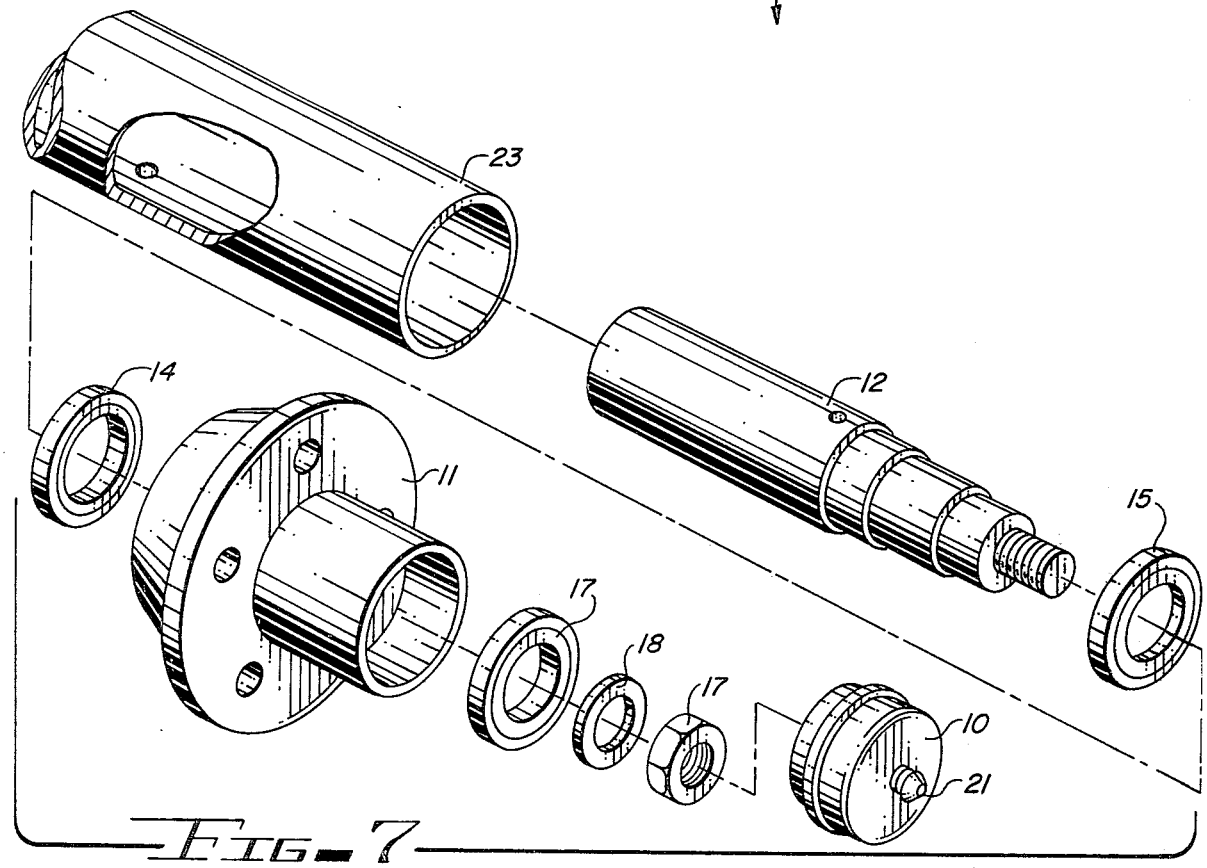
FIG. 7 is an exploded perspective view of the bearing assembly shown in FIGS. 1–6.

FIGS. 5 and 6 illustrate modifications of the sealed bearing assemblies for trailers shown in FIGS. 1 and 2 wherein like parts have the same reference characters.

In FIG. 5, a trailer axle 35 forming a right angle hollow configuration extends laterally from the spindle 12 of the bearing assembly with passageway 30 in the axle opening directly to atmosphere.

In FIG. 6, the right angle hollow axle configuration 26 is open to atmosphere at its elbow as shown.

It should be noted that although a pair of spaced bearings 13 and 14 are shown in the preferred embodiment, one bearing structure or bushing could be used in lieu thereof and still fall within the scope of this invention.

Further, unlike other trailer mounted bearing assemblies that vent to the atmosphere at a point where the discharged excess grease is thrown all over the trailer wheels, tires and side of the boat, the claimed structure vents to the atmosphere inside of the trailer frame depositing excess grease away from rotating surfaces.

Although but a few embodiments of the invention have been illustrated and described, it will be apparent to those skilled in the art that various changes and modifications may be made therein without departing from the spirit of the invention or from the scope of the appended claims.

What is claimed is:

1. A sealed bearing assembly comprising:
   a spindle,
   one end of said spindle being threaded,
   bearing means positioned over said spindle,
   a hub having a hollow cylindrical portion,
   said cylindrical portion being sleeved over one end of said spindle and said bearing means,
   attachment means threaded over said one end of said spindle for contact with said bearing means for maintaining said bearing means in contact with said cylindrical portion of said hub,
   a grease seal positioned within said other end of said cylindrical portion and extending annularly around said spindle between the inside periphery of said hub and said spindle, a hub cap for receiving grease under pressure interiorly thereof secured to said cylindrical portion of said hub and sealing said one end of said hub, said hub and said spindle defining a first passageway extending from the interior of said hub cap between the inside periphery of said cylindrical portion of said hub and said spindle and along said spindle and through said bearing means to said grease seal, and a second passageway extending from said first passageway at a point between said bearing means and said grease seal laterally through at least a part of said spindle to a third passageway, said third passageway extending longitudinally of said spindle and outwardly thereof to atmosphere.

2. The sealed bearing assembly set forth in claim 1 wherein:

said third passageway extends substantially axially of said spindle and outwardly from its other end to atmosphere.

3. The sealed bearing assembly set forth in claim 1 wherein:

said bearing means comprises an annular bushing.

4. A sealed bearing assembly comprising:

a spindle having a reduced diameter end portion, a threaded end on said reduced diameter end portion, first and second annular bearings spacedly positioned over the reduced diameter end portion of said spindle, a hub having a hollow cylindrical portion, said cylindrical portion being sleeved at one end over the reduced diameter end portion of said spindle and said bearings and having an inwardly extending portion for maintaining said bearings in axially spaced apart relationship along said spindle, attachment means threaded over the threaded end of said spindle in contact with said first bearing urging said bearings into contact with said cylindrical portion of said hub, a grease seal positioned within said other end of said cylindrical portion and extending annularly around said spindle between the inside periphery of said hub and said spindle, a hub cap for receiving grease under pressure interiorly thereof secured in the hollow interior of said cylindrical portion of said hub and over said attachment means, said hub and said spindle defining a first passageway extending from the interior of said hub cap through the first bearing, between the periphery of said cylindrical portion of said hub and said spindle and along said spindle and through the second bearing to said grease seal, and a second passageway extending from said first passageway at a point between said second bearing and said grease seal laterally through at least a part of said spindle to a third passageway, said third passageway extending through said spindle longitudinally thereof and outwardly therefrom to atmosphere.

5. The sealed bearing assembly set forth in claim 4 in further combination with:

a hollow axle axially secured to said other end of said spindle, said axle being provided with a port extending from its hollow interior to atmosphere, said port discharging any grease or air under pressure received interiorly of said axle from said third passageway to atmosphere.

6. The sealed bearing assembly set forth in claim 4 wherein:

said hub is provided with a flange extending laterally thereof for attaching a trailer wheel thereto.

7. The sealed bearing assembly set forth in claim 4 wherein:

said third passageway is of a predetermined length and diameter, whereby said third passageway serves as a reservoir for collecting grease passing out of the bearing assembly which grease bars water and dirt from entering the sealed bearing assembly from said other end of said spindle.

8. The sealed bearing assembly set forth in claim 4 wherein:

said first passageway is provided with an angular chamber between said grease seal and said second bearing, and said second passageway interconnects said chamber with said third passageway.

9. The sealed bearing assembly set forth in claim 4 wherein:

the diameter of said third passageway is larger than the diameter of said second passageway, whereby said third passageway serves as a reservoir for collecting grease passing out of the bearing assembly which grease bars water and dirt from entering the sealed bearing assembly from said other end of said spindle.

* * * * *